(12) United States Patent
Wang et al.

(10) Patent No.: US 12,374,222 B2
(45) Date of Patent: Jul. 29, 2025

(54) REAL-TIME DRIVING RISK ASSESSMENT METHOD EMPLOYING EQUIVALENT FORCE AND DEVICE THEREOF

(71) Applicant: TSINGHUA UNIVERSITY, Beijing (CN)

(72) Inventors: Jianqiang Wang, Beijing (CN); Xunjia Zheng, Beijing (CN); Heye Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 159 days.

(21) Appl. No.: 16/755,891

(22) PCT Filed: May 14, 2018

(86) PCT No.: PCT/CN2018/086639
§ 371 (c)(1),
(2) Date: Oct. 25, 2021

(87) PCT Pub. No.: WO2019/213981
PCT Pub. Date: Nov. 14, 2019

(65) Prior Publication Data
US 2022/0036735 A1 Feb. 3, 2022

(30) Foreign Application Priority Data
May 8, 2018 (CN) .......................... 201810433436.8

(51) Int. Cl.
*G08G 1/16* (2006.01)
*B60W 50/00* (2006.01)
*G06Q 50/26* (2024.01)

(52) U.S. Cl.
CPC ........... *G08G 1/16* (2013.01); *B60W 50/0098* (2013.01); *G06Q 50/265* (2013.01);
(Continued)

(58) Field of Classification Search
CPC ............... G08G 1/16; B60W 50/0098; B60W 2050/0031; B60W 2520/06;
(Continued)

(56) References Cited

U.S. PATENT DOCUMENTS

| | | | |
|---|---|---|---|
| 2013/0006513 A1* | 1/2013 | Nishiyama | B60W 50/14 |
| 2016/0264135 A1* | 9/2016 | Yamakado | B62D 15/0265 |
| 2017/0162049 A1* | 6/2017 | Lee | G08G 1/0112 |
| 2019/0333386 A1* | 10/2019 | Horita | G08G 1/166 |
| 2020/0098252 A1* | 3/2020 | Du | G08G 1/166 |

FOREIGN PATENT DOCUMENTS

| | | |
|---|---|---|
| CN | 104978853 A | 10/2015 |
| CN | 104239741 B * | 5/2016 |

(Continued)

*Primary Examiner* — Ramon A. Mercado
*Assistant Examiner* — Ellis B. Ramirez
(74) *Attorney, Agent, or Firm* — Bayramoglu Law Offices LLC

(57) ABSTRACT

A real-time assessment method of driving risk based on equivalent force includes: S1, collecting traffic environment information and various types of traffic environment use object information in a road environment in an area to be assessed; S2, inputting, into an electronic control unit of a vehicle, the traffic environment use object information and the environment information acquired in S1, wherein a road risk assessment model based on the equivalent force distribution is preset in the electronic control unit; S3, using the road risk assessment model, so as to acquire road traffic risk E of the vehicle i and equivalent force distribution $F_{ij}$ between the vehicle i and the object j in different traffic environments, wherein the object j represents any traffic element other than vehicle i in various traffic environment use object information. A real-time assessment device of driving risk based on equivalent force is further provided.

8 Claims, 6 Drawing Sheets

(52) U.S. Cl.
CPC . *B60W 2050/0031* (2013.01); *B60W 2520/06* (2013.01); *B60W 2520/10* (2013.01); *B60W 2520/12* (2013.01); *B60W 2554/801* (2020.02); *B60W 2554/802* (2020.02)

(58) Field of Classification Search
CPC ......... B60W 2520/10; B60W 2520/12; B60W 2554/801; B60W 2554/802; B60W 30/0953; B60W 2530/10; B60W 2554/4042; B60W 2554/4045; B60W 2554/80; B60W 2554/804; B60W 2554/805; B60W 30/0956; G06Q 50/265; G06Q 10/04; G06Q 10/0635
USPC ......... 701/119, 117, 301, 302; 340/933, 938
See application file for complete search history.

(56) References Cited

FOREIGN PATENT DOCUMENTS

| | | | | |
|---|---|---|---|---|
| CN | 106184229 A | * | 12/2016 | ............ B60W 50/14 |
| CN | 106203727 A | | 12/2016 | |
| CN | 106530706 A | | 3/2017 | |
| CN | 107291972 A | | 10/2017 | |
| CN | 107415941 A | | 12/2017 | |
| CN | 107618512 A | | 1/2018 | |
| CN | 107833312 A | | 3/2018 | |
| DE | 102011087781 A1 | * | 6/2013 | ............ B60W 10/02 |
| GB | 2529578 A | | 2/2016 | |
| JP | 2002140786 A | | 5/2002 | |

\* cited by examiner

REAL-TIME DRIVING RISK ASSESSMENT METHOD EMPLOYING EQUIVALENT FORCE AND DEVICE THEREOF

CROSS REFERENCE TO THE RELAYED APPLICATIONS

This application is the national phase entry of International Application No. PCT/CN2018/086639, filed on May 14, 2018, which is based upon and claims priority to Chinese Patent Application No. 201810433436.8, filed on May 8, 2018, the entire contents of which are incorporated herein by reference.

TECHNICAL FIELD

The present invention relates to the technical field of smart vehicles, in particular to a real-time assessment method of driving risk based on equivalent force and a device thereof.

BACKGROUND

With the development of the economy and the progress of society, the number of motor vehicles in China continues to increase, and the situation of traffic accidents is very serious. At present, great progress has been made in passive safety and active safety technology, which has contributed to a significant decrease in the number of traffic deaths. However, according to traffic accident statistics, the number of traffic accidents is still high. In 2015, there were 187,787 road traffic accidents involving casualties in China, resulting in 58022 deaths and 199880 injuries.

Intelligent transportation system (ITS, Intelligent transportation system) can reduce traffic accidents and improve traffic safety through the close cooperation of people, vehicles, and roads. However, traffic safety is affected by many traffic factors including various road users and the road environment, and the interaction between these factors is very complex. Therefore, the prior art mostly only considers the influence of limited factors (mainly surrounding vehicles), such as Advanced Driver Assistant System (ADAS), which is usually applied in simple scenarios such as straight driving and lane changing to reduce rear-end collisions and side collisions. accident. This type of technology is mostly based on vehicle dynamics and kinematics, and cannot adapt to the increasingly complex traffic environment. Existing traffic safety models based on the principles of vehicle kinematics and dynamics usually use vehicle state information (speed, acceleration, yaw rate, etc.) and the relative motion relationship between vehicles (relative speed, relative distance, etc.) to determine when the vehicle is in traffic. Risks caused by the environment. This type of traffic safety model is difficult to reflect the interaction and dynamic changes of driver characteristics, traffic environment and vehicle status.

In terms of road risk assessment methods, the existing technologies mainly include absolute number method, accident rate method and accident intensity analysis method. These analysis methods are mainly based on the macro statistics of traffic accidents that have occurred, such as the number of accidents, the number of casualties, economic losses, the number of local populations, the number of registered vehicles, and the number of deaths in 10,000 vehicles, and mathematical methods are used for evaluation. Although this kind of method has a certain guiding effect on the construction of traffic safety, its evaluation results are static, and cannot display the current safety status of the traffic environment in real time, let alone provide forward-looking guidance on traffic safety management within a certain time and space. At the same time, during the driving process, how the driver dynamically decides the expected trajectory of the car, that is, predicts the trajectory of the vehicle, is critical to driving risk assessment.

In the related research on the assessment of driving risk, most of the research failed to realize the requirement of real-time assessment. The prior art usually makes short-term predictions for the next moment based on the state of the previous moment of driving, and the selected evaluation index cannot effectively reflect the force situation between vehicles, that is, it does not fully explain the risk of the vehicle during driving. Other studies can guarantee real-time risk assessment, but do not provide a quantitative description of the risk value and cannot provide more detailed guidance for follow-up research. In driving scenes, the most classic scenes always cover two-car scenes, such as car following scenes, lane changing scenes, etc. Therefore, it is necessary to describe the relationship between the two vehicles in an intuitive and quantifiable way. The adoption of an equal effect method can directly reflect the force relationship between the two vehicles and provide support for risk quantification.

SUMMARY

The present invention aims to provide a real-time assessment method of driving risk based on equivalent force and a device thereof, which can fully reflect the current risk status of the human-vehicle-road closed-loop traffic system, adapt to various road users such as pedestrians, cyclists, and vehicles, and adapt to the dynamic interaction between road users and the traffic environment, enabling real-time assessment Safe state of the road traffic environment in a controllable area.

To achieve the above objective, the present invention provides a real-time assessment method of driving risk based on equivalent force, including:

S1, collecting traffic environment information and various types of traffic environment use object information in a road environment in an area to be assessed;

S2, inputting, into an electronic control unit of a vehicle, the traffic environment use object information and the environment information acquired in S1, wherein a road risk assessment model based on the equivalent force distribution is preset in the electronic control unit;

S3, using the road risk assessment model, so as to acquire road traffic risk E of the vehicle i and equivalent force distribution $F_{ij}$ between vehicle i and object j in different traffic environments, and the object j represents any traffic element other than vehicle i in various traffic environment use object information, the road traffic risk E may be expressed as the sum of kinetic energy $E_i$ of the vehicle i, kinetic energy $E_j$ of the object j, and the relative kinetic energy $E_{ij}$ between the vehicle i and the object j.

Further, "$E_{ij}$" and "$F_{ij}$" in S3 are defined as follows:

$$E_{ij} = \frac{1}{2}m_i v_i \cdot v_{ij}(\cos\theta_{ij}^* - \tan\theta_{ij}\sin\theta_{ij}^*);$$

$$F_{ij} = \frac{1}{2}w_{ki}w_{kj}F_{ij,max};$$

wherein, $F_{ij,max}$ represents a maximum equivalent force on the object j loaded by the vehicle i, $$F_{ij,max} = \frac{1}{2}m_i v_i \cdot \frac{v_{ij}(\cos\theta_{ij}^* - \tan\theta_{ij}\sin\theta_{ij}^*)}{d_{ij}};$$

$m^i$ represents a mass of the vehicle i; $v_i$ represents a speed of the vehicle i; $v_{ij}$ represents a relative speed between the vehicle i and the object j; $d_{ij}$ represents a relative distance between the vehicle i and the object j; $v_i$, $v_{ij}$, $d_{ij}$ each is a vector, $\theta_{ij}$ is an angle from $d_{ij}$ to $v_{ij}$, $\theta_{ij}^*$ is an angle from $d_{ij}$ to $v_i$, a counterclockwise direction is defined as positive; $w_{ki}$ is a probability weight of the vehicle i to maintain a current wheel angle and to change the current wheel angle; $w_{kj}$ is a probability weight of the object j to maintain an angle of current state and to change the angle.

Further, $$w_{ki} = \frac{p_{ki}(\delta_{ki})}{p_0(\delta_0)};$$

$$w_{kj} = \frac{p_{kj}(\delta_{kj})}{p_0(\delta_0)};$$

the object j is defined as a vehicle, $w_{kj}$ represents a probability weight of the vehicle j to maintain a current wheel angle and to change the current wheel angle; $p_{ki}(\delta_{ki})$ represents a steering probability of vehicle i at a next moment steering angle along a steering angle $\delta_{ki}$; $p_{ki}(\delta_{kj})$ represents a steering probability of vehicle j at a next moment steering angle along a steering angle $\delta_{kj}$; $\delta_0=0$ indicating straight-line driving, $p_0(\delta_0)$ indicating the probability that the vehicle i and the vehicle j go straight;

$p_{ki}(\delta_{ki})$, $p_{kj}(\delta_{kj})$, $p_0(\delta_0)$ can be obtained by the following calculation expression:

$$p_k(\delta_k) = \frac{1}{3.7704*\sqrt{2\pi}}e^{-\frac{\delta_k^2}{28.4318}}$$

$$\delta_k = k*\Delta\delta, k \in [-n, n]$$

wherein k, n∈Z; $\Delta\delta$ represents an increment of the steering angle; if k is a positive integer, $\delta_k$ means turning to left; if k is a negative integer, $\delta_k$ means turning to right.

Further, the method includes:

S4, based on the equivalent force distribution $F_{ij}$ obtained in S3, the rationality of steering probability of the vehicle is verified according to distribution law of the possible trajectory of the driver.

Futter, the S4 includes the following steps:

S41, taking the target weight distance $d_s$ of all feasible expected trajectory decisions s of the driver, s=1 . . . n, and forming a set D to be determined, $$D=\{d_1,d_2,d_3, \ldots d_n\};$$

S42, security $e_1$, efficiency $e_2$, maneuverability $e_3$ and regularity $e_4$ forming an evaluation index set as following:

$$E=\{e_1,e_2,e_3,e_4\};$$

through the security $e_1$, efficiency $e_2$, maneuverability $e_3$ and regularity $e_4$, the n feasible expected trajectory decisions s in S41 are evaluated using a relative membership matrix with following evaluation indicators:

$$M_t = \begin{bmatrix} m_{11} & m_{12} & \ldots & m_{1n} \\ m_{21} & m_{22} & \ldots & m_{2n} \\ m_{31} & m_{32} & \ldots & m_{3n} \\ m_{41} & m_{42} & \ldots & m_{4n} \end{bmatrix} = (m_{su})_{4*n};$$

S43, defining an appropriate expected trajectory decision s has the greatest relative membership, in the form of:

$$A_m={}_1A_2,A_3,A_4)^T=(1,1,1,1)^T;$$

S44, defining an inappropriate expected trajectory decision s has the smallest relative membership, in the form of:

$$B_m=(B_1,B_2,B_3,B_4)^T=(0,0,0,0)^T$$

S45, the evaluation indicators membership function of the expected trajectory decision s is expressed in vector form as:

$$m_s=(m_{1s},m_{2s},m_{3s},m_{4s})^T$$

S46, the difference between an actual trajectory decision u and the appropriate expected trajectory decision s is represented by the following generalized superior target weight distance $d_s^A$:

$$d_s^A = \sqrt[p]{\sum_{i=1}^{4}[w_s(A_s-m_{su})]^p};$$

wherein $m_{su}$ represents one of $m_{1s},m_{2s},m_{3s},m_{4s}$;

S47, the difference between the actual trajectory decision u and the inappropriate expected trajectory decision is expressed by the generalized poor target weight distance $d_s^B$:

$$d_s^B = \sqrt[p]{\sum_{s=1}^{4}[w_s(B_s-m_{su})]^p}$$

$$w = (w_1, w_2, w_3, w_4)^T, \sum_{s=1}^{4} w_s = 1;$$

p is a distance parameter, which is called Hamming distance when p=1; Euclidean distance when p=2;

$w_s$ represents weight for security $e_1$, efficiency $e_2$, maneuverability $e_3$ and regularity $e_4$;

S48, according to formulas in S46 and S47, the generalized superior target weight distance $d_s^A$ and the generalized poor target weight distance $d_s^B$ of all the decisions in the set D are obtained, and relative proximity index $C_s$, $C_s$ of the appropriate expected trajectory decision for each expected trajectory decision, are calculated according to the following formula:

$$C_s = \frac{d_s^B}{d_s^A + d_s^B}$$

the difference between an actual driving route and an optimal centerline path in the driver's multi-objective decision process, is compared by using the following optimization objective function:

$$f=\max(C_s)$$

if the difference is small, it means that the actual trajectory distribution approaches the road centerline, indicating that the convergence of road risk assessment models based on equivalent force distribution is good.

The present invention further provides a real-time assessment device of driving risk based on equivalent force, including:

an information collecting unit, configured to collect traffic environment information and various types of traffic environment use object information in a road environment in an area to be assessed;

an electronic control unit, which is preset with a road risk assessment model based on an equivalent force distribution, the electronic control unit is configured to receive the traffic environment information and various types of traffic environment use object information collected by the information collection unit;

wherein the road risk assessment model is used to acquire a road traffic risk E of the vehicle i in different traffic environments and the equivalent force distribution $F_{ij}$ between the vehicle i and the object j, and the object j represents any traffic element other than vehicle i in various traffic environment use object information, the road traffic risk E may be expressed as the sum of kinetic energy $E_i$ of the vehicle i, kinetic energy $E_j$ of the object j, and the relative kinetic energy $E_{ij}$ between the vehicle i and the object j.

Further, "$E_{ij}$" and "$F_{ij}$" in S3 are defined as follows:

$$E_{ij} = \frac{1}{2}m_i v_i \cdot v_{ij}(\cos\theta_{ij}^* - \tan\theta_{ij}\sin\theta_{ij}^*);$$

$$F_{ij} = \frac{1}{2}w_{ki}w_{kj}F_{ij,max};$$

wherein $F_{ij,max}$ represents the maximum equivalent force on the object j loaded by the vehicle i, $$F_{ij,max} = \frac{1}{2}m_i v_i \cdot \frac{v_{ij}(\cos\theta_{ij}^* - \tan\theta_{ij}\sin\theta_{ij}^*)}{d_{ij}};$$

$m_i$ represents a mass of the vehicle i; $v_i$ represents a speed of the vehicle i; $v_{ij}$ represents a relative speed between the vehicle i and the object j; $d_{ij}$ represents a relative distance between the vehicle i and the object j; $v_i$, $v_{ij}$, $d_{ij}$ each is a vector, $\theta_{ij}$ is an angle from $d_{ij}$ to $v_{ij}$, $\theta_{ij}^*$ is an angle from $d_{ij}$ to $v_i$, a counterclockwise direction is defined as positive; $w_{ki}$ is a probability weight of the vehicle i to maintain a current wheel angle and to change the current wheel angle; $w_{kj}$ is a probability weight of the object j to maintain an angle of current state and to change the angle.

Further, $$w_{ki} = \frac{p_{ki}(\delta_{ki})}{p_0(\delta_0)};$$

$$w_{kj} = \frac{p_{kj}(\delta_{kj})}{p_0(\delta_0)};$$

the object j is defined as a vehicle, $w_{kj}$ represents a probability weight of the vehicle j to maintain a current wheel angle and to change the current wheel angle; $p_{ki}(\delta_{ki})$ represents a steering probability of vehicle i at a next moment steering angle along a steering angle $\delta_{ki}$; $p_{kj}(\delta_{kj})$ represents a steering probability of vehicle j at a next moment steering angle along a steering angle $\delta_{kj}$; $\delta_0=0$ indicating straight-line driving, $p_0(\delta_0)$ indicating the probability that the vehicle i and the vehicle j go straight;

$p_{ki}(\delta_{ki})$, $p_{kj}(\delta_{kj})$, $p_0(\delta_0)$ can be obtained by the following calculation expression:

$$p_k(\delta_k) = \frac{1}{3.7704*\sqrt{2\pi}} e^{-\frac{\delta_k^2}{28.4318}}$$

$$\delta_k = k^*\Delta\delta, k \in [-n, n]$$

wherein k, n∈Z; $\Delta\delta$ represents an increment of the steering angle; if k is a positive integer, $\delta_k$ means turning to left; if k is a negative integer, $\delta_k$ means turning to right.

Further, the device includes:

a verification module, which is used for verifying the rationality of steering probability of the vehicle according to distribution law of the possible trajectory of the driver, based on the equivalent force distribution $F_{ij}$.

Further, the specific work of the verification module includes:

taking the target weight distance $d_s$ of all feasible expected trajectory decisions s of the driver, s=1 . . . n, and forming a set D to be determined, $$D=\{d_1,d_2,d_3, \ldots d_n\};$$

security $e_1$, efficiency $e_2$, maneuverability $e_3$ and regularity $e_4$ forming an evaluation index set as following:

$$E=\{e_1,e_2,e_3,e_4\};$$

through the security $e_1$, efficiency $e_2$, maneuverability $e_3$ and regularity $e_4$, using a relative membership matrix with following evaluation indicators to evaluate the n feasible expected trajectory decisions s, $$M_t = \begin{bmatrix} m_{11} & m_{12} & \ldots & m_{1n} \\ m_{21} & m_{22} & \ldots & m_{2n} \\ m_{31} & m_{32} & \ldots & m_{3n} \\ m_{41} & m_{42} & \ldots & m_{4n} \end{bmatrix} = (m_{su})_{4*n};$$

defining an appropriate expected trajectory decision s has the greatest relative membership, in the form of:

$$A_m=(A_1,A_2,A_3,A_4)^T=(1,1,1,1)^T;$$

defining an inappropriate expected trajectory decision s has the smallest relative membership, in the form of:

$$B_m=(B_1,B_2,B_3,B_4)^T=(0,0,0,0)^T$$

the evaluation indicators membership function of the expected trajectory decision s is expressed in vector form as:

$$m_s=(m_{1s},m_{2s},m_{3s},m_{4s})^T$$

the difference between an actual trajectory decision u and the appropriate expected trajectory decision s is represented by the following generalized superior target weight distance $d_s^A$:

$$d_s^A = \sqrt[p]{\sum_{i=1}^{4}[w_s(A_s - m_{su})]^p};$$

wherein $m_{su}$ represents one of $m_{1s},m_{2s},m_{3s},m_{4s}$;

the difference between the actual trajectory decision u and the inappropriate expected trajectory decision is expressed by the generalized poor target weight distance $d_s^B$:

$$d_s^B = \sqrt[p]{\sum_{s=1}^{4}[w_s(B_s - m_{su})]^p}$$

$$w = (w_1, w_2, w_3, w_4)^T, \sum_{s=1}^{4} w_s = 1;$$

p is a distance parameter, which is called Hamming distance when p=1; Euclidean distance when p=2;

$w_s$ represents weight for security $e_1$, efficiency $e_2$, maneuverability $e_3$ and regularity $e_4$;

according to formulas as above, the generalized superior target weight distance $d_s^A$ and the generalized poor target weight distance $d_s^B$ of all the decisions in the set D are obtained, and relative proximity index $C_s$, $C_s$ of the appropriate expected trajectory decision for each expected trajectory decision, are calculated according to the following formula:

$$C_s = \frac{d_s^B}{d_s^A + d_s^B}$$

the difference between an actual driving route and an optimal centerline path in the driver's multi-objective decision process, is compared by using the following optimization objective function:

$$f = \max(C_s)$$

if the difference is small, it means that the actual trajectory distribution approaches the road centerline, indicating that the convergence of road risk assessment models based on equivalent force distribution is good.

The present invention has the following advantages due to the above technical solutions.

1. The present invention can obtain real-time traffic environment information and various traffic environment use object information in the road environment in the area to be assessed, and can perform real-time driving risk assessment based on the surrounding environment information. Therefore, the present invention can provide a basis for vehicle path planning and driving decision-making. At the same time, the present invention forms a complete driving risk assessment system to be applied to typical scenarios. The present invention is suitable for the risk estimation between vehicles in any scenario, thereby being more conducive to promoting the development of auxiliary driving systems suitable for complex road conditions, thereby realizing large-scale industrial applications on commercial vehicles, military vehicles, and passenger vehicles.

2. The present invention provides a road risk assessment model based on an equal effectiveness distribution, so that the traffic risk distribution expressed in an equal effectiveness form can be calculated at any time. In this model, any surrounding moving objects can be included, not limited to vehicles that are directly close to the vehicle. The road risk assessment model based on equal power distribution takes more potential risk factors into consideration, and can realize the risk prediction of the surrounding driving environment. Based on this model, autonomous vehicles can more accurately identify traffic risks and make decisions from the perspective of risk situations. Therefore, autonomous vehicles can perform actions, such as acceleration, braking or path planning, more safely, thereby realizing automatic driving control.

3. The present invention can establish a driving risk assessment database regarding various scenarios, which may be widely used in traffic control. With the rapid development of smart vehicle technology, traffic managers have more opportunities to capture the movement information of all road users in a timely manner, including GPS location, vehicle speed, pedestrians, and so on. In this case, real-time traffic risk assessment of each road in the urban environment can be used to manage and control traffic safety in a timely manner. It will be a big advantage for traffic management personnel to manage traffic flow based on the timely allocation of traffic risks. By using the present invention, under the balanced control of risk and efficiency, the traffic environment will become safer and more efficient.

BRIEF DESCRIPTION OF THE DRAWINGS

FIGS. 8A and 8B are is a diagram of an equivalent force distribution in a safety field according to an embodiment of the present invention; wherein, FIG. 8A is a schematic diagram, and FIG. 8B is a traffic risk diagram;

DETAILED DESCRIPTION OF THE EMBODIMENTS

The invention will now be described in detail in conjunction with the drawings and embodiments.

The real-time assessment method of driving risk based on equivalent force provided by one embodiment includes:

S1, collecting traffic environment information and various types of traffic environment use object information in a road environment in an area to be assessed.

"Traffic environment information" includes roadside equipments used to collect traffic environment information. For example, roadside equipments includes road cameras (single/binocular cameras), radar (millimeter wave radar), and communication base stations for people, vehicles, and road networks.

"Traffic environment use object information" includes the type and state of the traffic environment use object, wherein the types of the traffic environment use object include non-motor vehicles (non-motor vehicles including pedestrians, bicycles, motorcycles, etc.), and motor vehicles (motor vehicles including small vehicles, buses and trucks, etc., objects, fixed traffic signs and facilities. The state of the traffic environment use object includes information such as the speed and speed direction of the object, geometric size, category, mass, and the like. The objects are stationary objects on the road surface, including a movable guardrail and a cone. The fixed traffic signs and facilities include traffic lights, static traffic signs (for example, a speed limit board, warning signs), and the like.

S2. Inputting, into an electronic control unit of a vehicle, the traffic environment use object information and the environment information acquired in S1, wherein a road risk assessment model based on the equivalent force distribution is preset in the electronic control unit.

S3, Using the road risk assessment model, so as to acquire a road traffic risk E of the vehicle i and the equivalent force distribution $F_{ij}$ between the vehicle i and the object j in different traffic environments, and the object j represents any traffic element other than vehicle i in various traffic environment use object information, the road traffic risk E may be expressed as the sum of kinetic energy $E_i$ of the vehicle i, kinetic energy $E_j$ of the object j, and the relative kinetic energy $E_{ij}$ between the vehicle i and the object j.

In the following, the "$E_{ij}$" and "$F_{ij}$" in S3 will be described in detail according to various traffic environments or traffic scenes.

First, "follow-up scene" (or vehicle following scene) and "overtaking scene", in which object j is defined as a vehicle.

(1) Follow-Up Scene

Figure 1:
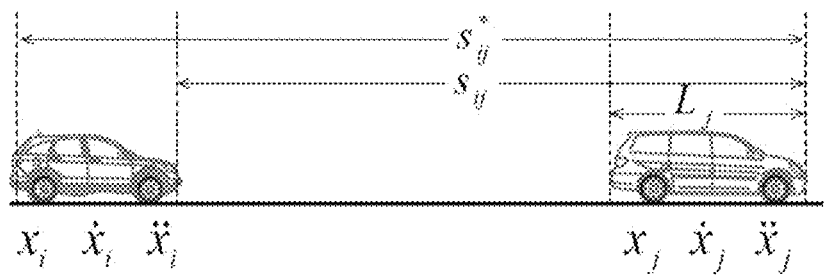
FIG. 1 is a schematic diagram of a vehicle following scene according to an embodiment of the present invention.

FIG. 1 shows the road traffic risk in a follow-up scene. The follow-up scene means that vehicles are driven as queues or clusters on city roads and highways.

In FIG. 1, s*ij represents the occupied space of the vehicle i and the vehicle j in the traffic environment, sij represents the head distance between the vehicle i and the vehicle j, Lj represents the length of the vehicle j, $x_i$ represents the longitudinal position of the vehicle i, and $x_j$ represents the longitudinal position of the object j, $x_i$ is the longitudinal displacement of the vehicle i, is the longitudinal speed of the vehicle i, is the longitudinal acceleration of the vehicle i, is the longitudinal displacement of the vehicle j, is the longitudinal speed of the vehicle j, and $\ddot{x}_j$ is the longitudinal acceleration of the vehicle j.

The traffic risk caused by vehicle i and vehicle j is the same as that of a single moving object. Therefore, traffic risks are defined as follows:

$$E_i = \frac{1}{2}m_i v_i \cdot \frac{(v_i - 0)}{\Delta x_i} \cdot \Delta x_i$$

$$E_j = \frac{1}{2}m_j v_j \cdot \frac{(v_j - 0)}{\Delta x_j} \cdot \Delta x_j$$

Where $m_i$ represents the mass of the vehicle i, $m_j$ represents the mass of the object j, $v_i$ represents the speed of the vehicle i, $v_j$ represents the speed of the object j, $x_i$ represents the longitudinal position of the vehicle i, $x_j$ represents the longitudinal position of the object j, and $\Delta x_i$ represents the distance between the vehicle i and its target point in front of it. $\Delta x_j$ represents the distance between the moving object j and the target point in front of it.

In the follow-up, a collision event may only occur between the following vehicle (vehicle behind) i and the vehicle ahead j. That is, if event A is set to indicate that vehicle i has collided with vehicle j, and event B indicates that vehicle j has collided with vehicle i, the probability of event A must be greater than zero, and the probability B of the event is absolutely equal to zero. Therefore, the present embodiment defines the following vehicle as an active collision participant (ACP) and the preceding vehicle as a passive collision participant (PCP). The traffic risk between ACP and PCP is defined as follows:

$$E_{ij} = \frac{1}{2}m_i v_i \cdot \frac{(v_i - v_j)}{|x_i - x_j|}|x_i - x_j| = \frac{1}{2}m_i v_i \cdot TTCi \cdot |x_i - x_j|$$

This embodiment sets Fij=½mivi*TTCi, and Fij represents the equivalent force on the object j loaded by the vehicle i. "$E_{ij}$", "$F_{ij}$", and "$F_{ij,max}$" can be expressed as:

$$E_{ij} = F_{ij,max} \cdot d =$$
$$\frac{1}{2}m_i v_i \cdot \frac{v_{ij}(\cos\theta_{ij}^* - \tan\theta_{ij}\sin\theta_{ij}^*)}{d_{ij}} \cdot d_{ij} = \frac{1}{2}m_i v_i \cdot v_{ij}(\cos\theta_{ij}^* - \tan\theta_{ij}\sin\theta_{ij}^*)$$

Where $F_{ij,max}$ is the maximum equivalent force on the object j loaded by the vehicle i, and its specific expression is:

$$F_{ij,max} = \frac{1}{2}m_i \vec{v}_i^* \cdot \frac{\vec{v}_{ij}}{\sqrt{d_{ij}^2 - d_{ij}^{*2}}} =$$
$$\frac{1}{2}m_i v_i \cdot \frac{v_{ij}\cos(\theta_{ij} + \theta_{ij}^*)}{d_{ij}\cos\theta_{ij}} = \frac{1}{2}m_i v_i \cdot \frac{v_{ij}(\cos\theta_{ij}^* - \tan\theta_{ij}\sin\theta_{ij}^*)}{d_{ij}}$$

Where $m_i$ is the mass of vehicle i, $v_i$ is the speed of vehicle i, $v_{ij}$ is the relative speed between vehicle i and object j; $\theta_{ij}$ is the angle from $d_{ij}$ to $v_{ij}$; $\theta_{ij}^*$ is the angle from $d_{ij}$ to vi; counterclockwise is defined as positive; $d_{ij}$ represents the relative distance between vehicle i and object j, ie $|x_i - x_1|$; TTCi represents the reciprocal of TTC, and TTC is the collision time.

Therefore, the traffic risk E of the road environment under the follow-up scene can be defined as the sum of the kinetic energy $E_i$ of the vehicle i, the kinetic energy $E_j$ of the object j and the relative kinetic energy $E_{ij}$ between the vehicle i and the object j.

The above section describes the relationship between two vehicles in the follow-up scene.

(2) Overtaking Scene

Figure 2:
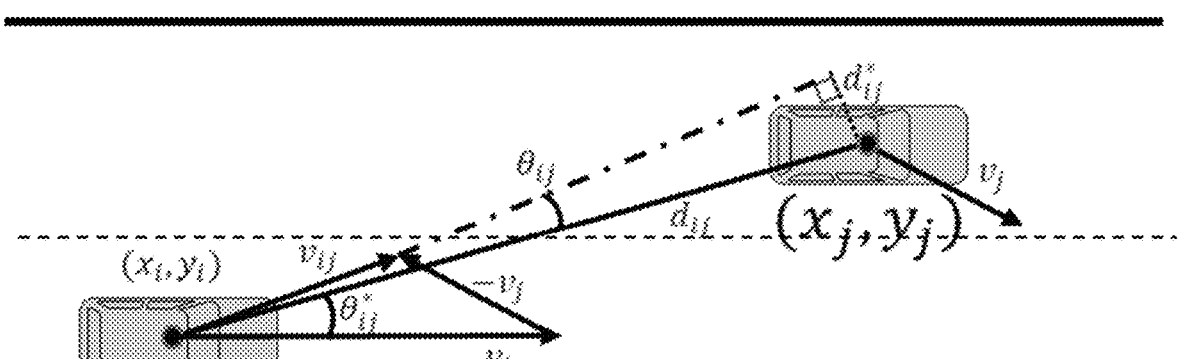
FIG. 2 is a schematic diagram of an overtaking scene according to an embodiment of the present invention.

FIG. 2 Shows the Overtaking Scene.

In FIG. 2, $(x_i, y_i)$ indicates the position of the vehicle i, $(x_j, y_j)$ indicates the position of the vehicle j, $v_i$ indicates the speed of the vehicle i, and $v_j$ indicates the speed of the vehicle j. $v_{ij}$ and $d_{ij}$ represent the relative speed and distance between vehicle i and vehicle j, respectively, $d_{ij}^*$ is the minimum relative distance between vehicle i and vehicle j, and $v_i$, $v_j$, $v_{ij}$, $d_{ij}$ and $d_{ij}^*$ each is a vector. $\theta_{ij}$ is the angle from $d_{ij}$ to $v_{ij}$, $\theta_{ij}^*$ is the angle from $d_{ij}$ to vi, and the counter-clockwise direction is positive. Therefore, the maximum force on the vehicle j loaded by the vehicle i is calculated as follows:

$$F_{ij,max} = \frac{1}{2} m_i \vec{v_i} \cdot \frac{\vec{v_{ij}}}{\sqrt{d_{ij}^2 - d_{ij}^{*2}}} =$$
$$\frac{1}{2} m_i v_i \cdot \frac{v_{ij} \cos(\theta_{ij} + \theta_{ij}^*)}{d_{ij} \cos\theta_{ij}} = \frac{1}{2} m_i v_i \cdot \frac{v_{ij}(\cos\theta_{ij}^* - \tan\theta_{ij}\sin\theta_{ij}^*)}{d_{ij}}$$

Then there is:

$$E_{ij} = F_{ij,max} \cdot d_{ij} =$$
$$\frac{1}{2} m_i v_i \cdot \frac{v_{ij}(\cos\theta_{ij}^* - \tan\theta_{ij}\sin\theta_{ij}^*)}{d_{ij}} \cdot d_{ij} = \frac{1}{2} m_i v_i \cdot v_{ij}(\cos\theta_{ij}^* - \tan\theta_{ij}\sin\theta_{ij}^*)$$

In addition, FIG. 2 shows a transient scenario where the overtaking behavior of vehicle j is a continuous process, all variables in the graph are time-varying, and $F_{ij,max}$ has the same properties.

(3) Two-Vehicle Scene

Figure 3:
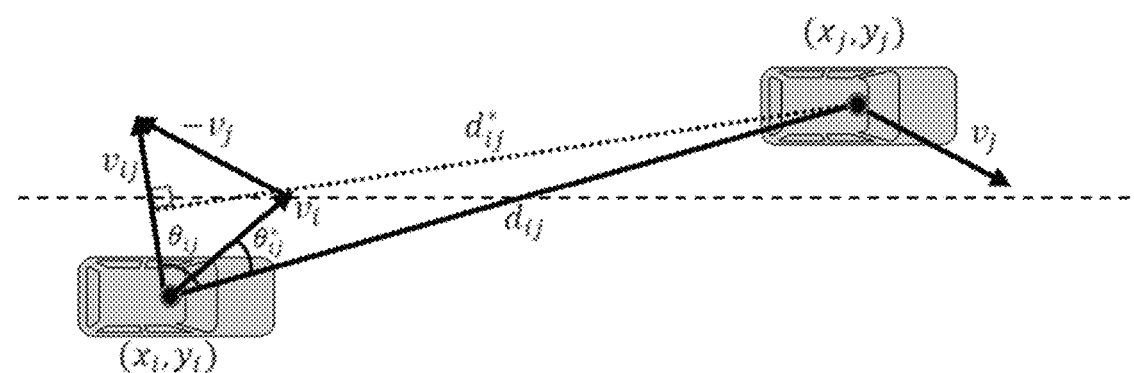
FIG. 3 is a schematic diagram of a two-vehicles scene according to an embodiment of the present invention.

In two-vehicle scene (FIG. 3), the same method as the overtaking scenario can be used for analysis. The traffic risk between vehicle i and vehicle j is as follows:

$$E_{ij} = F_{ij,max} \cdot d_{ij} =$$
$$\frac{1}{2} m_i v_i \cdot \frac{v_{ij}(\cos\theta_{ij}^* - \tan\theta_{ij}\sin\theta_{ij}^*)}{d_{ij}} \cdot d_{ij} = \frac{1}{2} m_i v_i \cdot v_{ij}(\cos\theta_{ij}^* - \tan\theta_{ij}\sin\theta_{ij}^*)$$

The maximum force on the vehicle j loaded by i is calculated as follows:

$$F_{ij,max} = \frac{1}{2} m_i \vec{v_i} \cdot \frac{\vec{v_{ij}}}{\sqrt{d_{ij}^2 - d_{ij}^{*2}}} =$$
$$\frac{1}{2} m_i v_i \cdot \frac{v_{ij} \cos(\theta_{ij} + \theta_{ij}^*)}{d_{ij} \cos\theta_{ij}} = \frac{1}{2} m_i v_i \cdot \frac{v_{ij}(\cos\theta_{ij}^* - \tan\theta_{ij}\sin\theta_{ij}^*)}{d_{ij}}$$

In two-vehicle scene, the real-time risk of driving can also be described by mathematical equations.

Figure 4:
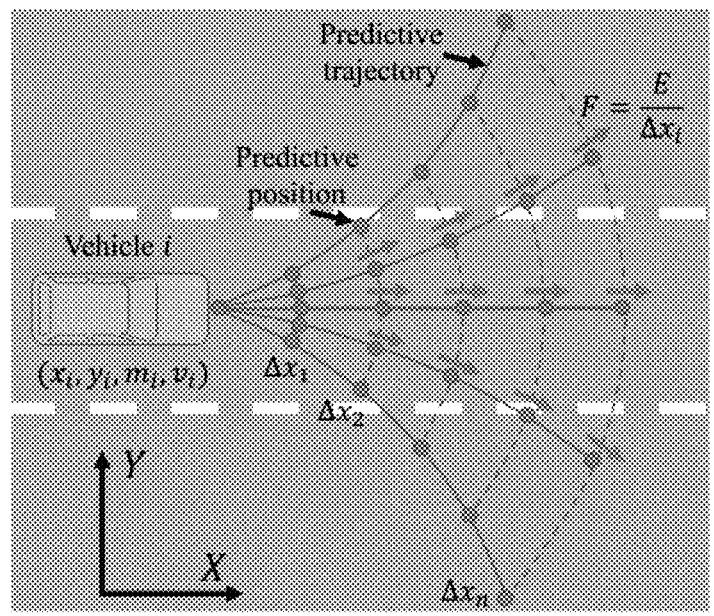
FIG. 4 is a schematic diagram of a range of predicted possible motion trajectories according to an embodiment of the present invention.

As shown in FIG. 4, in a traffic environment, the driving risk is always generated by the interaction of road users and the road traffic environment. The driving risk is related to the road user's movement status and road environmental conditions. When a traffic accident occurs, it is necessary to predict the range of driving risk so as to make better driving route decision-making. Therefore, the present embodiment proposes an evaluation method that considers the range of influence of the vehicle risk, and establishes a road risk assessment model based on the equivalent force distribution.

According to certain traffic rules and road constraints that road users must observe in the traffic environment, this embodiment assumes that during normal driving and steering, the driver always follows the traffic rules and laws. That is, the vehicle can only travel forward in the straight lane. Therefore, when a vehicle is in a free-running state on a straight road, it is assumed that its speed and steering angle are continuous constant values. The position of the vehicle in the road environment at the next moment can be predicted by the road risk assessment model based on the equivalent force distribution, and the possible motion trajectory of the vehicle can be predicted based on each predicted position.

A schematic diagram of the range of possible motion trajectories is shown in FIG. 4.

As shown in FIG. 4, $(x_i, y_i)$ represents the current position information of the vehicle i. $m_i$ indicates the mass of the vehicle i. $v_i$ indicates the speed of vehicle i. $\Delta x_i$ indicates the distance between the vehicle i and the target point in front of it. The dark gray circle in the figure indicates the position of the predicted point (Predictive position), and the curve in which the predicted points are sequentially connected is based on the predicted trajectory (Predictive trajectory) of the predicted positions. F represents the effect of vehicle i on each position, and the turning radius R is calculated as following:

$$R(t) = [1 + K v_i^2(t)] \frac{L}{\delta(t)}$$

Where K represents the stability factor, L represents the wheelbase of the vehicle i, and $\delta$ represents the steering angle.

When the vehicle i is driving at a constant speed with a negligible side slip angle, the predicted position $(x_{ip}, y_{ip})$ at the time range $t_p$ with the commanded steering angle $\delta$ can be calculated as follows:

$$\begin{bmatrix} x_{ip} \\ y_{ip} \end{bmatrix} = \begin{bmatrix} x_{t_0} + \int_{t_0}^{t_p} v_i(t) \cdot \cos\frac{v_i(t)}{R(t)} dt \\ y_{t_0} + \int_{t_0}^{t_p} v_i(t) \cdot \sin\frac{v_i(t)}{R(t)} dt \end{bmatrix}$$

It is assumed that the vehicle i is always has been in a controlled and stable driving state. The maximum speed and turning radius should be determined according to road conditions. The motion state of vehicle i is limited by the following formula:

$$F_X^2 + F_Y^2 = \varphi F_Z$$
$$F_X = m_i g f + \frac{C_D A v_i^2(t)}{21.15}$$
$$F_Y \geq m_i \frac{v_i^2(t)}{R(t)}$$

Wherein, $F_X$ and $F_Y$ respectively represent a longitudinal and lateral forces of the vehicle $F_Z$ represents a ground reaction force, $\varphi$ represents a adhesion coefficient, f represents a rolling resistance coefficient, $C_D$ represents an air resistance coefficient, and A represents the windward area of the vehicle i.

According to the above, the relationship between the steering angle $\delta$ and the speed can be derived as follows:

According to the above, the relationship between the steering angle δ and the speed $v_i$ can be derived as follows:

$$|\delta(t)| \leq \left[\frac{K}{M} + \frac{1}{M \cdot v_i^2(t)}\right]\sqrt{N - 2F_f W \cdot v_i^2(t) - W^2 \cdot v_i^4(t)}$$

among them, $$W = \frac{C_D A}{21.15}$$
$$N = \varphi^2 F_Z^2 - m_i^2 g^2 f^2$$
$$M = m_i / L$$
$$F_f = m_i g f$$

As the speed of the vehicle increases, the allowable steering angle is obtained as follows:

$$|\delta(t)| \leq \left[\frac{K}{M} + \frac{1}{M \cdot v_i^2(t)}\right]\sqrt{N - 2F_f W \cdot v_i^2(t) - W^2 \cdot v_i^4(t)}$$

The steering angle $\delta_t$ is related to the mechanical design of the vehicle i, the maximum of which is equal to the steering angle limit $\delta_{max}$. Usually, the passenger vehicle is $\delta_{max} \in [-\pi/4, \pi/4]$.

$$|\delta(t)| \leq \delta_{max}$$

Further depending on the range of steering angles, the possible trajectory of the vehicle i should have a certain boundary and the motion state of the vehicle i is stable within this boundary.

Figure 5:
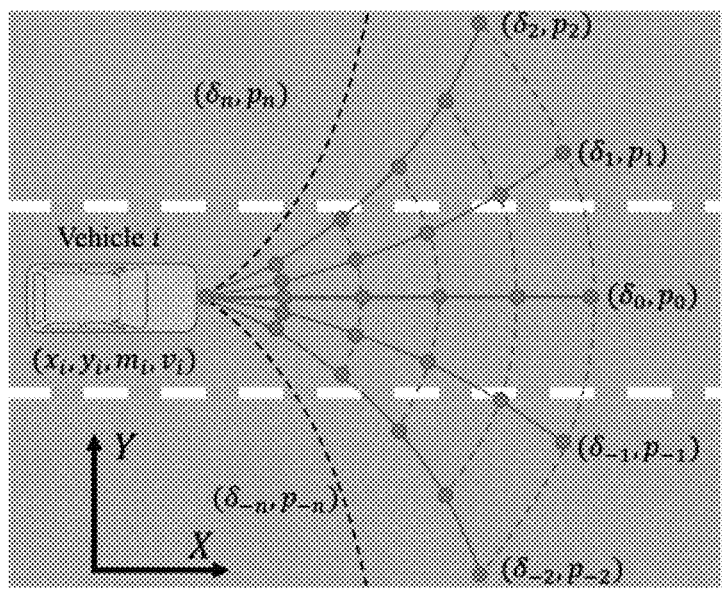
FIG. 5 is a schematic diagram of a trajectory based on a turning angle and a turning probability according to an embodiment of the present invention.

In FIG. 5, $(x_i, y_i)$ represents the current position of the vehicle i, $m_i$ represents the mass of the vehicle i, and $v_i$ represents the speed of the vehicle i. (δ, p) is the steering angle and probability of occurrence of different curves in the graph. As shown in FIG. 5, the outermost dotted line indicates the left and right limits of the predicted trajectory. When the vehicle is going straight on the road, the driver can take the following actions: go straight, turn to the left lane, turn to the right lane. This embodiment assumes that the driver will turn the steering wheel, δk represents the steering angle of the vehicle, and Pk represents the steering probability of the vehicle, and the turning probability Pk can be defined as follows:

$$\sum_{k=-n}^{n} p_k = 1$$
$$\delta_k = k^* \Delta \delta, k \in [-n, n]$$

Where k, n∈Z; Δ δ represents the increment of the steering angle; if k is a positive integer, δ k means turning to the left; if k is a negative integer, δ k means turning to the right.

However, it is difficult to predict the driver's steering angle and assign a corresponding value to the steering probability. To solve this problem, the present embodiment uses real free driving experimental data.

Figure 6:
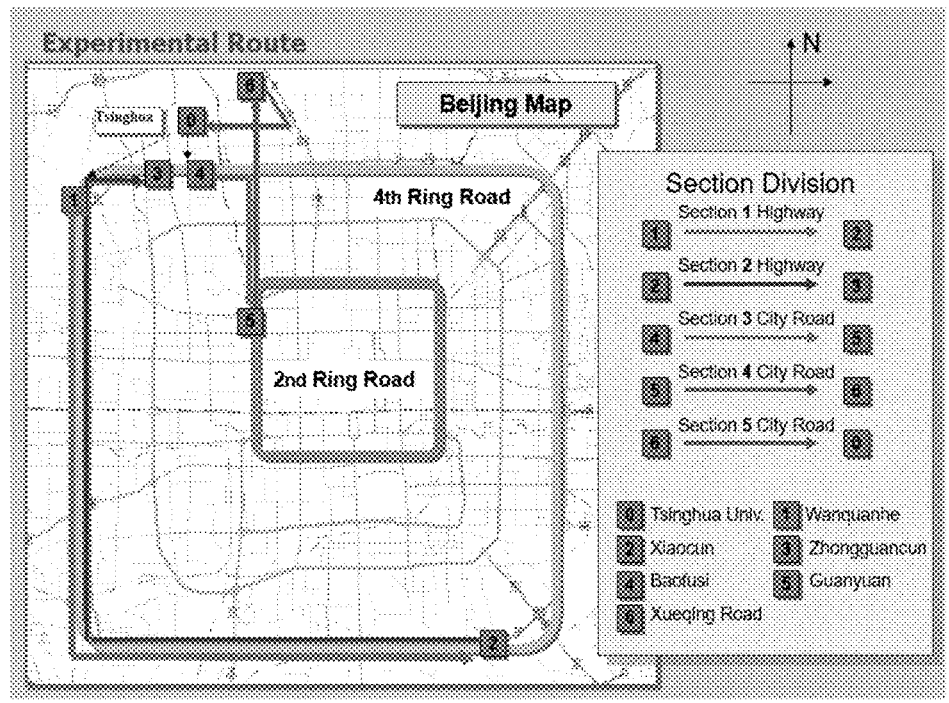
FIG. 6 is an experimental roadmap according to an embodiment of the present invention.

The details of the experimental route are shown in FIG. 6. The free driving database contains a large amount of raw experimental data of actual and experienced drivers, including GPS data and vehicle data. In addition, the database contains measurement points for approximately 32.5 hours and over 110,000 road experimental data. Therefore, this embodiment counts all highway experimental statistics to analyze the steering angle of the driver. The probability of the steering angle of the highway section is basically Gaussian normal distribution.

Figure 7:
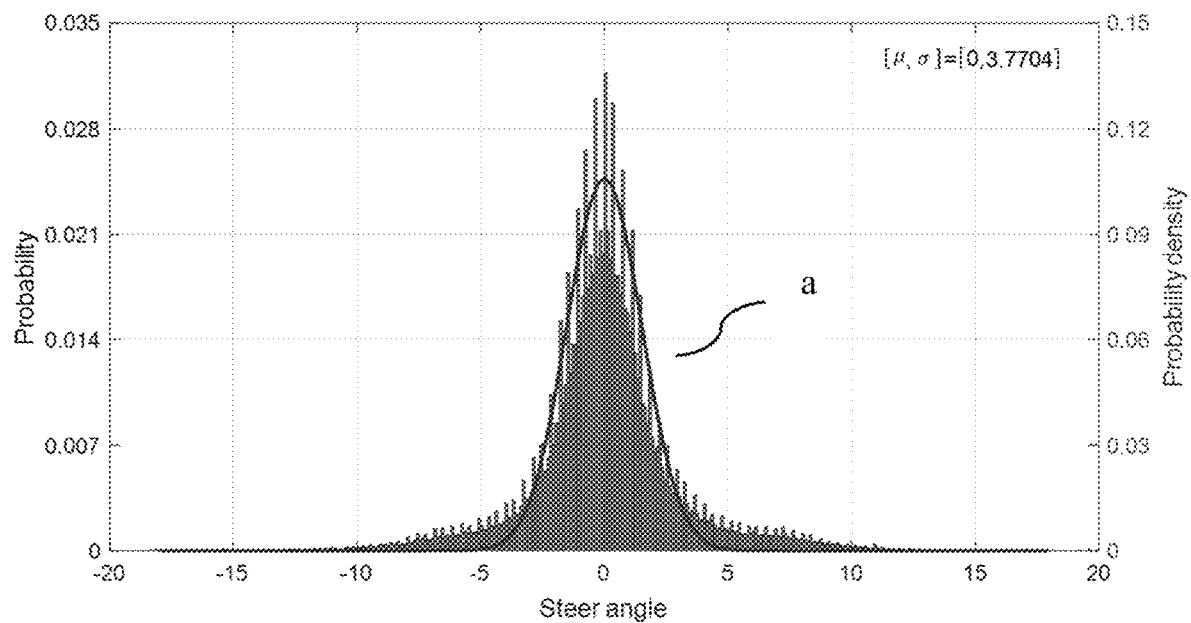
FIG. 7 is a diagram of the probability distribution of turning on a high-speed road section according to an embodiment of the present invention.

The details of the results are shown in FIG. 7. The Gaussian normal distribution is defined as follows:

$$p_k(\delta_k) = f(\delta_k | \mu, \sigma) = \frac{1}{\sigma\sqrt{2\pi}} e^{-\frac{(\delta_k - \mu)^2}{2\sigma^2}} = \frac{1}{3.7704 * \sqrt{2\pi}} e^{-\frac{\delta_k^2}{28.4318}}$$

Figure 8A:
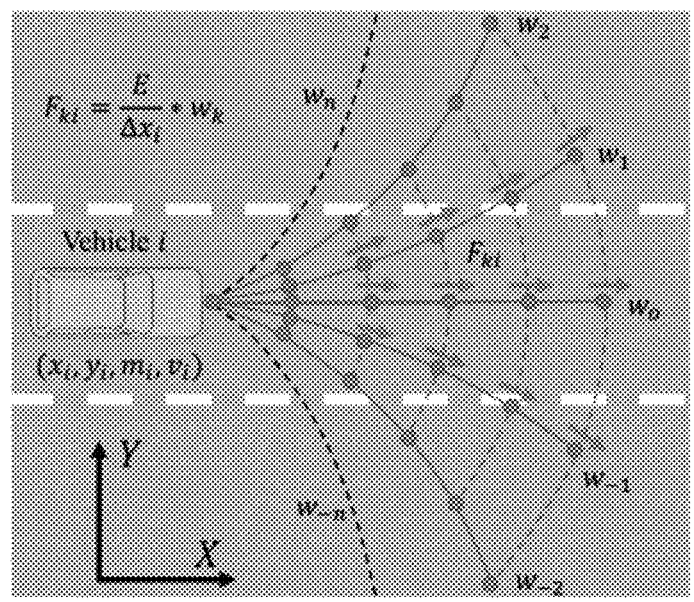
Figure 8B:
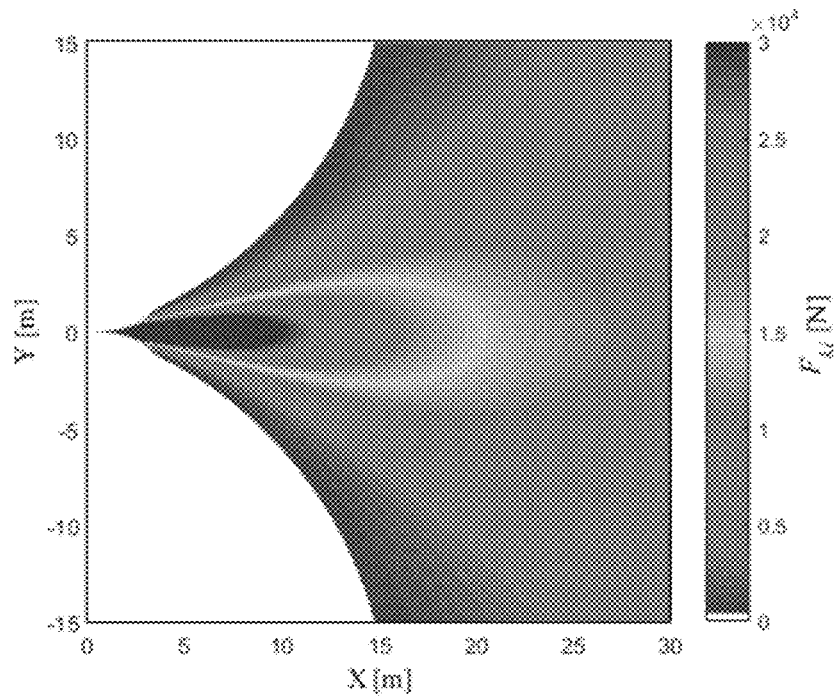

As shown in FIGS. 8A and 8B, the present invention describes a new concept in the field of traffic safety, which uses a series of equivalent forces to describe the potential impact of the traffic environment on road users. Following this principle, when road users, including vehicles, pedestrians and cyclists, are driving on the road, the road environment will be covered by this force. As mentioned earlier, traffic risks are caused by active collision participants (ACP) and passive collision participants (PCP). Active or passive is a relative concept. In a real traffic environment, each road user can be displayed as an ACP or PCP in different time and space. By analyzing the range and distribution of equal effects, the safety rate of the road environment can be quantified. The value of the equivalent force decreases as the distance between the predicted point and the road user increases. Similarly, in FIG. 8A, the weight wk at which the vehicle i or the vehicle j maintains the current state and the probability of changing the steering angle can be defined as:

$$w_k = \frac{p_k(\delta_k)}{p_0(\delta_0)}$$

k∈[−n, n] and k, n∈Z. $p_0(\delta_0)$ indicates the probability that the vehicle will stay at an angle at the next moment; $p_k(\delta_k)$ indicates the probability that the vehicle will turn at the angle at the next moment.

The equivalent force of each predicted point of the vehicle i can be calculated as follows:

$$F_{ki} = \frac{E}{\Delta x_i} \cdot w_k = \frac{\frac{1}{2} w_k m_i v_i^2}{\Delta x_i}$$

Finally, the traffic risk map of the straight-through vehicle i is described by MATLAB, as shown in FIG. 8B (mi=1500 kg, vi=20 m/s). For ease of analysis, the zero value of the equivalent force is set to white. The boundary of the traffic risk-affected area is clearly shown by the curved curve separated by the white area and the deep blue area in FIG. 8B. Furthermore, the value of the equivalent force gradually decreases as the longitudinal and lateral distances increase. Furthermore, it can be seen that the boundaries of the above-mentioned affected areas will vary with vehicle speed and road conditions. It has a property that changes over time. Therefore, the traffic risk map is a map that changes over time.

Similarly, for the two vehicles, the weight of the equivalent force and equivalent force of the vehicle i may be defined as $w_{ki}$. The weight of the equivalent force and equivalent force of the vehicle j may be defined as $w_{kj}$.

$$w_{ki} = \frac{p_{ki}(\delta_{ki})}{p_0(\delta_0)}$$

$$w_{kj} = \frac{p_{kj}(\delta_{kj})}{p_0(\delta_0)}$$

Then it can be obtained that the equivalent force on the vehicle j loaded by the vehicle i can be calculated as follows:

$$F_{ij} = \frac{1}{2} w_{ki} w_{kj} m_i \vec{v}_i \cdot \frac{\vec{v}_{ij}}{\sqrt{d_{ij}^2 - d_{ij}^{*2}}} =$$

$$\frac{1}{2} w_{ki} w_{kj} m_i v_i \cdot \frac{v_{ij}\cos(\theta_{ij} + \theta_{ij}^*)}{d_{ij}\cos\theta_{ij}} = \frac{1}{2} w_{ki} w_{kj} m_i v_i \cdot \frac{v_{ij}(\cos\theta_{ij}^* - \tan\theta_{ij}\sin\theta_{ij}^*)}{d_{ij}}$$

The equivalent force of vehicle i on the traffic environment $F_{ki}$ is expressed as:

$$F_{ki} = \frac{\frac{1}{2} w_{ki} m_i v_i^2}{\Delta x_i}.$$

Then the kinetic energy of the vehicle i is: $E_i = F_{ki} \cdot \Delta x_i$

The equivalent force of object j on the traffic environment $F_{kj}$ is expressed as:

$$F_{kj} = \frac{\frac{1}{2} w_{kj} m_j v_j^2}{\Delta x_j},$$

then the kinetic energy $E_j$ of the object j is:

$$E_j = F_{kj} \cdot \Delta x_j$$

Figure 9:
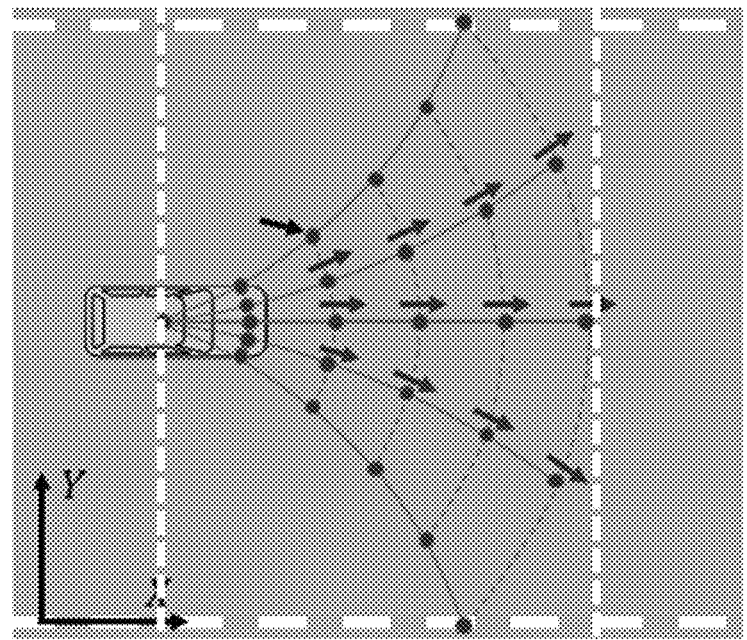
FIG. 9 is a schematic diagram of an expected trajectory of a vehicle according to an embodiment of the present invention.

On the basis of FIGS. 8A and 8B, according to the distribution law of the possible trajectory of the driver, the probability verification is vehicleried out. In the actual driving process, there may be a certain deviation between the driver's manipulation behavior of the vehicle and the probability distribution of the expected driving trajectory. Therefore, the prediction of the driver's operation of the vehicle can be understood as the process of the driver's pursuit of optimal operation by seeking advantages and avoiding disadvantages. FIG. 9 shows a schematic diagram of the expected trajectory of the vehicle, and the trajectory schematic diagram is obtained through the calculated equivalent force distribution.

Figure 10:
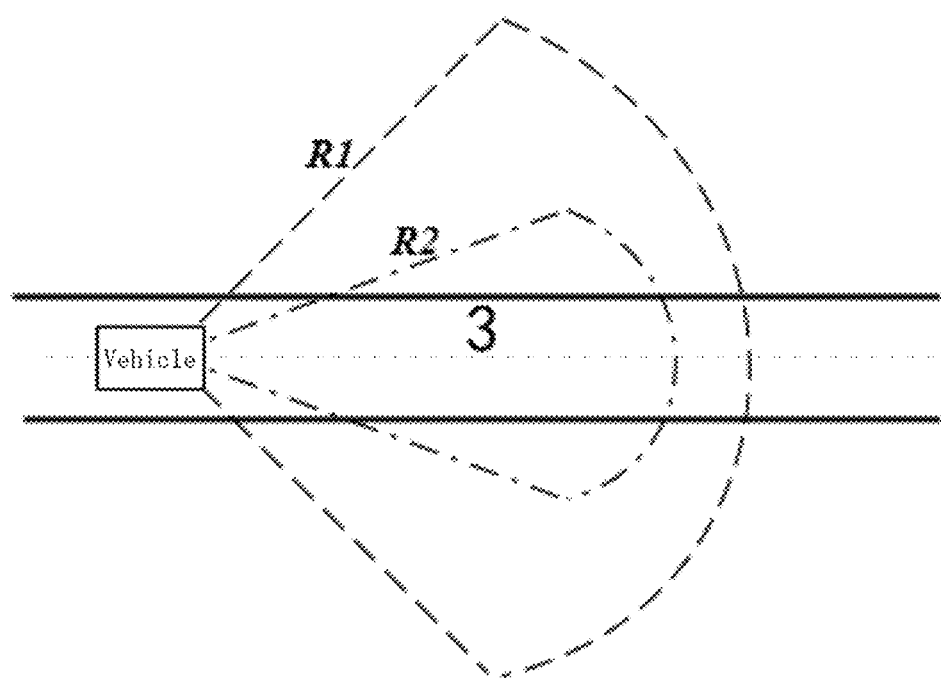
FIG. 10 is a schematic diagram of a driver's vision transfer process according to an embodiment of the present invention.

As shown in FIG. 10, the driver's perception range of the surrounding environment of the vehicle during driving has a characteristic of distributed perception to concentrated sensing. During the driving process, the driver's attention distribution law is as shown in FIG. 10. The driver's attention is first focused on the sweeping sector 1 with a radius of R1 centered on the vehicle. Then, under the premise of safety, the driver's line of sight is concentrated, and the line of sight stays in the sweeping sector 2 with the vehicle as the center and a radius of R2. At first, the driver's key visual information only considers the range near the center line of the adjacent road. Finally, under the premise of ensuring the safety of the vehicle, the driver will focus on the area in front of the vehicle lane, that is, area 3. Therefore, in the actual driving process, the driver's reception of visual information also affects the trajectory prediction.

In a normal driving process, the driver will give priority to ensuring the safety of the vehicle, that is, ensure that there is a certain relative distance between the vehicle and the boundary of the feasible area of the road, so that the vehicle can drive in a relatively safe position in the feasible area. Secondly, as far as the driver's own factors are concerned, the driver always hopes that the input action change to the vehicle is as small as possible, which is expressed in terms of ease of maneuverability. Drivers seek to reach their destinations as efficiently as possible, so there is an index of efficiency. Finally, the turning angle and range of the car must comply with the traffic rules during the driving process. The design performance of the vehicles itself determines that the vehicle's turning ability has certain limitations. Such restrictions correspond to regular indicators. Therefore, when evaluating whether the predicted trajectory is in line with the actual manipulation trajectory, the four indicators used include security, efficiency, maneuverability and regularity.

The method of the embodiment of the present invention further includes:

S4, based on the equivalent force distribution $F_{ij}$ obtained in S3, the rationality of steering probability of the vehicle is verified according to distribution law of the possible trajectory of the driver.

S4 includes the following steps:

S41, taking the target weight distance $d_s$ of all feasible expected trajectory decisions s of the driver, s=1 ... n, and forming a set D to be determined, $$D = \{d_1, d_2, d_3, \ldots d_n\};$$

S42, security $e_1$, efficiency $e_2$, maneuverability $e_3$ and regularity $e_4$ forming an evaluation index set as following:

$$E = \{e_1, e_2, e_3, e_4\};$$

through the security $e_1$, efficiency $e_2$, maneuverability $e_3$ and regularity $e_4$, the n feasible expected trajectory decisions s in S41 are evaluated using a relative membership matrix with following evaluation indicators:

$$M_t = \begin{bmatrix} m_{11} & m_{12} & \cdots & m_{1n} \\ m_{21} & m_{22} & \cdots & m_{2n} \\ m_{31} & m_{32} & \cdots & m_{3n} \\ m_{41} & m_{42} & \cdots & m_{4n} \end{bmatrix} = (m_{su})_{4*n};$$

S43, defining an appropriate expected trajectory decision s has the greatest relative membership, in the form of:

$$A_m = (A_1, A_2, A_3, A_4)^T = (1,1,1,1)^T;$$

S44, defining an inappropriate expected trajectory decision s has the smallest relative membership, in the form of:

$$B_m = (B_1, B_2, B_3, B_4)^T = (0,0,0,0)^T$$

S45, the evaluation indicators membership function of the expected trajectory decision s is expressed in vector form as:

$$m_s = (m_{1s}, m_{2s}, m_{3s}, m_{4s})^T$$

S46, the difference between an actual trajectory decision u and the appropriate expected trajectory decision s is represented by the following generalized superior target weight distance $d_s^A$:

$$d_s^A = \sqrt[p]{\sum_{i=1}^{4}[w_s(A_s - m_{su})]^p};$$

wherein $m_{su}$ represents one of $m_{1s}, m_{2s}, m_{3s}, m_{4s}$;

S47, the difference between the actual trajectory decision u and the inappropriate expected trajectory decision is expressed by the generalized poor target weight distance $d_s^B$:

$$d_s^B = \sqrt[p]{\sum_{i=1}^{4}[w_s(B_s - m_{su})]^p}$$

$$w = (w_1, w_2, w_3, w_4)^T,$$

$$\sum_{s=1}^{4} w_s = 1;$$

p is a distance parameter, which is called Hamming distance when p=1; Euclidean distance when p=2;

$w_s$ represents weight for security $e_1$, efficiency $e_2$, maneuverability $e_3$ and regularity $e_4$;

S48, according to formulas in S46 and S47, the generalized superior target weight distance $d_s^A$ and the generalized poor target weight distance $d_s^B$ of all the decisions in the set D are obtained, and relative proximity index $C_s$, $C_s$ of the appropriate expected trajectory decision for each expected trajectory decision, are calculated according to the following formula:

$$C_s = \frac{d_s^B}{d_s^A + d_s^B}$$

the difference between an actual driving route and an optimal centerline path in the driver's multi-objective decision process, is compared by using the following optimization objective function:

$$f = \max(C_s)$$

if the difference is small, it means that the actual trajectory distribution approaches the road centerline, indicating that the convergence of road risk assessment models based on equivalent force distribution is good.

Figure 11:
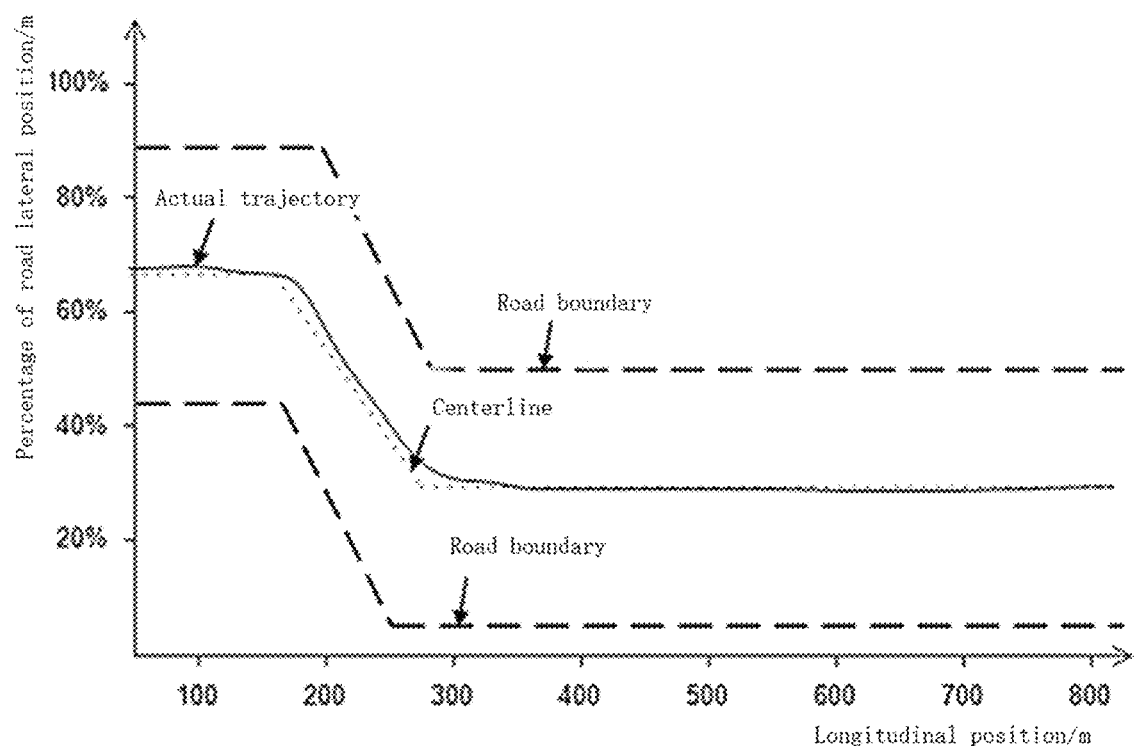
FIG. 11 is a schematic diagram of the convergence of the driving trajectory according to an embodiment of the present invention.

As shown in FIG. 11, it can be seen that the difference between the actual driving route and the optimal centerline path in the driver's multi-objective decision process is small, that is, the actual trajectory distribution approaches the road centerline, which indicates that the convergence of the model is very good. Through the above simulation analysis, it can be considered that the set trajectory distribution probability is in line with the actual driving situation, and the predicted driving trajectory is highly realistic.

In the above embodiments, the reference coordinate system based on $x_i$ can be defined as: the x-axis is a horizontal axis parallel to the traveling direction of the vehicle i, the y-axis is a vertical axis perpendicular to the traveling direction of the vehicle i, and the positive direction of the x-axis is the traveling direction of the vehicle i.

The invention also provides a real-time assessment device of driving risk based on equivalent force, including: an information collecting unit and an electronic control unit.

The information collecting unit is configured to collect traffic environment information and various types of traffic environment use object information in a road environment in an area to be assessed.

The electronic control unit is preset with a road risk assessment model based on an equivalent force distribution, the electronic control unit is configured to receive the traffic environment information and various types of traffic environment use object information collected by the information collection unit.

The road risk assessment model is used to acquire a road traffic risk E of the vehicle i in different traffic environments and the equivalent force distribution $F_{ij}$ between the vehicle i and the object j, and the object j represents any traffic element other than vehicle i in various traffic environment use object information, the road traffic risk E may be expressed as the sum of kinetic energy $E_i$ of the vehicle i, kinetic energy $E_j$ of the object j, and the relative kinetic energy $E_{ij}$ between the vehicle i and the object j.

In one embodiment, the "$E_{ij}$" and "$F_{ij}$" obtained by the road risk assessment model based on the equivalent force distribution are as follows:

$$E_{ij} = \frac{1}{2}m_i v_i \cdot v_{ij}(\cos\theta_{ij}^* - \tan\theta_{ij}\sin\theta_{ij}^*);$$

$$F_{ij} = \frac{1}{2}w_{ki}w_{kj}F_{ij,max};$$

$F_{ij,max}$ is the maximum equivalent force on the object j loaded by the vehicle i, and its specific expression is:

$$F_{ij,max} = \frac{1}{2}m_i v_i \cdot \frac{v_{ij}(\cos\theta_{ij}^* - \tan\theta_{ij}\sin\theta_{ij}^*)}{d_{ij}};$$

$m_i$ represents a mass of the vehicle $v_i$; represents a speed of the vehicle i; $v_{ij}$ represents a relative speed between the vehicle i and the object j; $d_{ij}$ represents a relative distance between the vehicle i and the object; $v_i$, $v_{ij}$, $d_{ij}$ each is a vector, $\theta_{ij}$ is an angle from $d_{ij}$ to $v_{ij}$, $\theta_{ij}^*$ is an angle from $d_{ij}$ to $v_i$, a counterclockwise direction is defined as positive; $w_{ki}$ is a probability weight of the vehicle i to maintain a current wheel angle and to change the current wheel angle; $w_{ki}$ is a probability weight of the object j to maintain an angle of current state and to change the angle.

The "$E_{ij}$" and "$F_{ij}$" obtained in the above embodiments can be displayed on the graphical interface of the vehicle for the driver's reference, and the autonomous vehicle can perform operations more safely, such as acceleration, braking or path planning, thereby implementing an automatic driving control. "$E_{ij}$" and "$F_{ij}$" can be displayed on the graphical interface of the traffic management system for traffic management personnel to manage the traffic flow according to the traffic risk. With the present invention, the traffic environment will become safer and more efficient under the balance of risk and efficiency.

In one embodiment, "$w_{ki}$" and "$w_{kj}$" are calculated by the following formulas, respectively, $$w_{ki} = \frac{p_{ki}(\delta_{ki})}{p_0(\delta_0)};$$

-continued $$w_{kj} = \frac{p_{kj}(\delta_{kj})}{p_0(\delta_0)};$$

the object j is defined as a vehicle, $w_{kj}$ represents a probability weight of the vehicle j to maintain a current wheel angle and to change the current wheel angle; $p_{ki}(\delta_{ki})$ represents a steering probability of vehicle i at a next moment steering angle along a steering angle $\theta_{ki}$; $p_{kj}(\delta_{kj})$ represents a steering probability of vehicle j at a next moment steering angle along a steering angle $\delta_{kj}$; $\delta_0=0$ indicating straight-line driving, $p_0(\delta_0)$ indicating the probability that the vehicle i and the vehicle j go straight;

$p_{ki}(\delta_{ki})$, $p_{kj}(\delta_{kj})$, $p_0(\delta_0)$ can be obtained by the following calculation expression:

$$p_k(\delta_k) = \frac{1}{3.7704 * \sqrt{2\pi}} e^{-\frac{\delta_k^2}{28.4318}}$$

$$\delta_k = k * \Delta\delta,$$

$$k \in [-n, n]$$

wherein k, n∈Z; $\Delta\delta$ represents an increment of the steering angle; if k is a positive integer, $\delta_k$ means turning to left; if k is a negative integer, $\delta_k$ means turning to right.

In one embodiment, the device further include a verification module, which is used for verifying the rationality of steering probability of the vehicle according to distribution law of the possible trajectory of the driver, based on the equivalent force distribution $F_{ij}$.

In another embodiment, the specific work of the verification module includes:

taking the target weight distance $d_s$ of all feasible expected trajectory decisions s of the driver, s=1 ... n, and forming a set D to be determined, $$D=\{d_1, d_2, d_3, \ldots d_n\};$$

security $e_1$, efficiency $e_2$, maneuverability $e_3$ and regularity $e_4$ forming an evaluation index set as following:

$$E=\{e_1, e_2, e_3, e_4\};$$

through the security $e_1$, efficiency $e_2$, maneuverability $e_3$ and regularity $e_4$, using a relative membership matrix with following evaluation indicators to evaluate the n feasible expected trajectory decisions s, $$M_t = \begin{bmatrix} m_{11} & m_{12} & \cdots & m_{1n} \\ m_{21} & m_{22} & \cdots & m_{2n} \\ m_{31} & m_{32} & \cdots & m_{3n} \\ m_{41} & m_{42} & \cdots & m_{4n} \end{bmatrix} = (m_{su})_{4*n};$$

defining an appropriate expected trajectory decision s has the greatest relative membership, in the form of:

$$A_m = (A_1, A_2, A_3, A_4)^T = (1,1,1,1)^T;$$

defining an inappropriate expected trajectory decision s has the smallest relative membership, in the form of:

$$B_m = (B_1, B_2, B_3, B_4)^T = (0,0,0,0)^T$$

the evaluation indicators membership function of the expected trajectory decision s is expressed in vector form as:

$$m_s = (m_{1s}, m_{2s}, m_{3s}, m_{4s})^T$$

the difference between an actual trajectory decision u and the appropriate expected trajectory decision s is represented by the following generalized superior target weight distance $d_s^A$:

$$d_s^A = \sqrt[p]{\sum_{i=1}^{4} [w_s(A_s - m_{su})]^p};$$

wherein $m_{su}$ represents one of $m_{1s}, m_{2s}, m_{3s}, m_{4s}$;

the difference between the actual trajectory decision u and the inappropriate expected trajectory decision is expressed by the generalized poor target weight distance $d_s^B$:

$$d_s^B = \sqrt[p]{\sum_{i=1}^{4} [w_s(B_s - m_{su})]^p}$$

$$w = (w_1, w_2, w_3, w_4)^T,$$

$$\sum_{s=1}^{4} w_s = 1;$$

p is a distance parameter, which is called Hamming distance when p=1; Euclidean distance when p=2;

$w_s$ represents weight for security $e_1$, efficiency $e_2$, maneuverability $e_3$ and regularity $e_4$;

according to formulas as above, the generalized superior target weight distance $d_s^A$ and the generalized poor target weight distance $d_s^B$ of all the decisions in the set D are obtained, and relative proximity index $C_s$, $C_s$ of the appropriate expected trajectory decision for each expected trajectory decision, are calculated according to the following formula:

$$C_s = \frac{d_s^B}{d_s^A + d_s^B}$$

the difference between an actual driving route and an optimal centerline path in the driver's multi-objective decision process, is compared by using the following optimization objective function:

$$f = \max(C_s)$$

if the difference is small, it means that the actual trajectory distribution approaches the road centerline, indicating that the convergence of road risk assessment models based on equivalent force distribution is good.

Finally, it should be noted that the above embodiments are only used to illustrate the technical solutions of the present invention, and are not limited thereto. It should be understood by those skilled in the art that the technical solutions described in the foregoing embodiments may be modified, or some of the technical features may be equivalently substituted; the modifications or substitutions do not deviate from the spirit and scope of the technical solutions of the embodiments.

What is claimed is:

1. A real-time assessment method of driving risk based on equivalent force, comprising:
   S1, collecting traffic environment information and various types of traffic environment use object information in a road environment in an area to be assessed;
   S2, inputting, into an electronic control unit of a vehicle, the various types of traffic environment use object information and the traffic environment information acquired in S1, wherein a road risk assessment model based on an equivalent force distribution is preset in the electronic control unit;
   S3, using the road risk assessment model to acquire a road traffic risk E of a vehicle i and an equivalent force distribution $F_{ij}$ between the vehicle i and an object j in different traffic environments, wherein the object j represents any traffic element other than the vehicle i in the various types of traffic environment use object information, the road traffic risk E is expressed as a sum of kinetic energy $E_i$ of the vehicle i, kinetic energy $E_j$ of the object j, and relative kinetic energy $E_{ij}$ between the vehicle i and the object j;
   S4, based on the equivalent force distribution $F_{ij}$ obtained in S3, verifying a rationality of steering probability of the vehicle according to a distribution law of a possible trajectory of a driver; and
   S5, based on the equivalent force distribution $F_{ij}$ obtained in S3 and on S4, controlling driving of the vehicle by at least one of acceleration or braking of the vehicle.

2. The real-time assessment method according to claim 1, wherein $E_{ij}$ and $F_{ij}$ in S3 are defined as follows:

$$E_{ij} = \frac{1}{2} m_i v_i \cdot v_{ij} (\cos\theta_{ij}^* - \tan\theta_{ij}\sin\theta_{ij}^*);$$

$$F_{ij} = \frac{1}{2} w_{ki} w_{kj} F_{ij,max};$$

wherein, $F_{ij,max}$ represents a maximum equivalent force on the object j loaded by the vehicle i, and is expressed as:

$$F_{ij,max} = \frac{1}{2} m_i v_i \cdot \frac{v_{ij}(\cos\theta_{ij}^* - \tan\theta_{ij}\sin\theta_{ij}^*)}{d_{ij}};$$

wherein, $m_i$ represents a mass of the vehicle i; $v_i$ represents a speed of the vehicle i; $v_{ij}$ represents a relative speed between the vehicle i and the object j; $d_{ij}$ represents a relative distance between the vehicle i and the object j; $v_i$, $v_{ij}$, $d_{ij}$, each is a vector, is an angle from $d_{ij}$ to $v_{ij}$, $\theta_{ij}^*$ is an angle from $d_{ij}$ to $v_i$, a counterclockwise direction is defined as positive; $w_{ki}$ is a probability weight of the vehicle i to maintain a current wheel angle and to change the current wheel angle; $w_{kj}$ is a probability weight of the object j to maintain an angle of a current state and to change the angle of the current state.

3. The real-time assessment method according to claim 2, wherein $$w_{ki} = \frac{p_{ki}(\delta_{ki})}{p_0(\delta_0)};$$

$$w_{kj} = \frac{p_{kj}(\delta_{kj})}{p_0(\delta_0)};$$

the object j is defined as a vehicle, $w_{kj}$ represents a probability weight of a vehicle j to maintain the current wheel angle and to change the current wheel angle; $p_{ki}(\delta_{ki})$ represents a steering probability of the vehicle i at a next moment steering angle along a steering angle $\delta_{ki}$; $p_{kj}(\delta_{kj})$ represents a steering probability of the vehicle j at the next moment steering angle along a steering angle $\delta_{kj}$; $\delta_0=0$ indicates straight-line driving, $p_0(\delta_0)$ indicates a probability that the vehicle i and the vehicle j go straight;
$p_{ki}(\delta_{ki})$, $p_{kj}(\delta_{kj})$, $p_0(\delta_0)$ are obtained by the following calculation expression:

$$p_k(\delta_k) = \frac{1}{3.7704 * \sqrt{2\pi}} e^{-\frac{\delta_k^2}{28.4318}},$$

$$\delta_k = k * \Delta\delta, k \in [-n, n],$$

wherein k, n∈Z; Δδ represents an increment of a steering angle; when k is a positive integer, $\delta_k$ means turning to left; when k is a negative integer, $\delta_k$ means turning to right.

4. The real-time assessment method according to claim 1, wherein the S4 comprises the following steps:
   S41, taking a target weight distance $d_s$ of n feasible expected trajectory decisions s of the driver, s=1 ... n, and forming a set D to be determined, $$D=\{d_1,d_2,d_3, \ldots d_n\};$$

S42, forming an evaluation index set by a security $e_1$, an efficiency $e_2$, a maneuverability $e_3$ and a regularity $e_4$ as follows:

$$E=\{e_1,e_2,e_3,e_4\};$$

through the security $e_1$, the efficiency $e_2$, the maneuverability $e_3$ and the regularity $e_4$, evaluating the n feasible expected trajectory decisions s in S41 using a relative membership matrix with evaluation indicators as follows:

$$M_t = \begin{bmatrix} m_{11} & m_{12} & \cdots & m_{1n} \\ m_{21} & m_{22} & \cdots & m_{2n} \\ m_{31} & m_{32} & \cdots & m_{3n} \\ m_{41} & m_{42} & \cdots & m_{4n} \end{bmatrix} = (m_{su})_{4*n};$$

S43, defining an appropriate expected trajectory decision s having a greatest relative membership, in a form of:

$$A_m=(A_1,A_2,A_3,A_4)^T=(1,1,1,1)^T;$$

S44, defining an inappropriate expected trajectory decision s having a smallest relative membership, in a form of:

$$B_m=(B_1,B_2B_3B_4)^T=(0,0,0,0)^T$$

S45, expressing an evaluation indicator membership function of an expected trajectory decision s in vector form as:

$$m_s=(m_{1s},m_{2s},m_{3s},m_{4s})^T$$

S46, representing a difference between an actual trajectory decision u and the appropriate expected trajectory decision s by a generalized superior target weight distance de as follows:

$$d_s^A = \sqrt[p]{\sum_{i=1}^{4} [w_s(A_s - m_{su})]^p};$$

wherein $m_{su}$ represents one of $m_{1s}$, $m_{2s}$, $m_{3s}$, $m_{4s}$;

S47, expressing a difference between the actual trajectory decision u and the inappropriate expected trajectory decision by a generalized poor target weight distance $d_s^B$ as follows:

$$d_s^B = \sqrt[p]{\sum_{s=1}^{4} [w_s(B_s - m_{su})]^p} \text{ wherein,}$$

$$w = (w_1, w_2, w_3, w_4)^T, \sum_{s=1}^{4} w_s = 1;$$

p is a distance parameter, wherein p is called Hamming distance when p=1; p is called Euclidean distance when p=2;

$w_s$ represents a weight for the security $e_1$, the efficiency $e_2$, the maneuverability $e_3$ and the regularity $e_4$;

S48, according to formulas in S46 and S47, obtaining the generalized superior target weight distance $d_s^A$ and the generalized poor target weight distance $d_s^B$ of all decisions in the set D, and calculating a relative proximity index $C_s$, $C_s$ of the appropriate expected trajectory decision for each expected trajectory decision according to the following formula:

$$C_s = \frac{d_s^B}{d_s^A + d_s^B},$$

comparing a difference between an actual driving route and an optimal centerline path in a multi-objective decision process of the driver by using the following optimization objective function:

$$f=\max(C_s),$$

wherein when the difference is small, an actual trajectory distribution approaches a road centerline, indicating that a convergence of the road risk assessment model based on the equivalent force distribution is good.

5. A real-time assessment device of driving risk based on equivalent force, comprising:
an information collecting unit, wherein the information collecting unit is configured to collect traffic environment information and various types of traffic environment use object information in a road environment in an area to be assessed; and
an electronic control unit, wherein electronic control unit is preset with a road risk assessment model based on an equivalent force distribution, the electronic control unit is configured to receive the traffic environment information and the various types of traffic environment use object information collected by the information collection unit,
wherein the road risk assessment model is used to acquire a road traffic risk E of a vehicle i and an equivalent force distribution $F_{ij}$ between the vehicle i and an object j in different traffic environments, and the object j represents any traffic element other than the vehicle i in the various types of traffic environment use object information, the road traffic risk E is expressed as a sum of kinetic energy $E_i$ of the vehicle i, kinetic energy $E_j$ of the object j, and relative kinetic energy $E_{ij}$ between the vehicle i and the object j; and
a verification module, wherein the verification module is configured to verify a rationality of steering probability of the vehicle according to a distribution law of a possible trajectory of a driver based on the equivalent force distribution $F_{ij}$,
wherein the electronic control unit is configured to, based on the equivalent force distribution $F_{ij}$ obtained and on the verifying of the verification module, control driving of the vehicle by at least one of acceleration or braking of the vehicle.

6. The real-time assessment device according to claim 5, wherein a specific work of the verification module comprises:
taking a target weight distance $d_s$ of n feasible expected trajectory decisions s of the driver, s=1 . . . n, and forming a set D to be determined, $$D=\{d_1,d_2,d_3, \ldots d_n\};$$

forming an evaluation index set by a security $e_1$, an efficiency $e_2$, a maneuverability $e_3$ and a regularity $e_4$ as follows:

$$E=\{e_1,e_2,e_3,e_4\};$$

through the security $e_1$, the efficiency $e_2$, the maneuverability $e_3$ and the regularity $e_4$, using a relative membership matrix with evaluation indicators as follows to evaluate the n feasible expected trajectory decisions s, $$M_t = \begin{bmatrix} m_{11} & m_{12} & \ldots & m_{1n} \\ m_{21} & m_{22} & \ldots & m_{2n} \\ m_{31} & m_{32} & \ldots & m_{3n} \\ m_{41} & m_{42} & \ldots & m_{4n} \end{bmatrix} = (m_{su})_{4*n};$$

defining an appropriate expected trajectory decision s having a greatest relative membership, in a form of:

$$A_m=(A_1,A_2,A_3,A_4)^T=(1,1,1,1)^T;$$

defining an inappropriate expected trajectory decision s having a smallest relative membership, in a form of:

$$B_m=(B_1,B_2,B_3B_4)^T=(0,0,0,0)^T$$

expressing an evaluation indicator membership function of an expected trajectory decision s in vector form as:

$$m_s=(m_{1s},m_{2s},m_{3s},m_{4s})^T$$

representing a difference between an actual trajectory decision u and the appropriate expected trajectory decision s by a generalized superior target weight distance de as follows:

$$d_s^A = \sqrt[p]{\sum_{i=1}^{4} [w_s(A_s - m_{su})]^p};$$

wherein my represents one of $m_{1s}$, $m_{2s}$, $m_{3s}$, $m_{4s}$;

expressing a difference between the actual trajectory decision u and the inappropriate expected trajectory decision by a generalized poor target weight distance $d_s^B$ as follows:

$$d_s^B = \sqrt[p]{\sum_{s=1}^{4}[w_s(B_s - m_{su})]^p} \text{ wherein,}$$

$$w = (w_1, w_2, w_3, w_4)^T, \sum_{s=1}^{4} w_s = 1;$$

p is a distance parameter, wherein p is called Hamming distance when p=1; p is called Euclidean distance when p=2;

$w_s$ represents a weight for the security $e_1$, the efficiency $e_2$, the maneuverability $e_3$ and the regularity $e_4$;

according to formulas as above, obtaining the generalized superior target weight distance $d_s^A$ and the generalized poor target weight distance $d_s^B$ of all decisions in the set D, and calculating a relative proximity index $C_s$ of the appropriate expected trajectory decision for each expected trajectory decision according to the following formula:

$$C_s = \frac{d_s^B}{d_s^A + d_s^B},$$

comparing a difference between an actual driving route and an optimal centerline path a multi-objective decision process of the driver, is compared by using the following optimization objective function:

$f=\max(C_s)$, wherein when the difference is small, an actual trajectory distribution approaches a road centerline, indicating that a convergence of the road risk assessment model based on the equivalent force distribution is good.

7. The real-time assessment device according to claim 5, wherein $E_{ij}$ and $F_{ij}$ in S3 are defined as follows:

$$E_{ij} = \frac{1}{2}m_i v_i \cdot v_{ij}(\cos\theta_{ij}^* - \tan\theta_{ij}\sin\theta_{ij}^*);$$

$$F_{ij} = \frac{1}{2}w_{ki}w_{kj}F_{ij,max};$$

wherein $F_{ij,max}$ represents a maximum equivalent force on the object j loaded by the vehicle i, and is expressed as:

$$F_{ij,max} = \frac{1}{2}m_i v_i \cdot \frac{v_{ij}(\cos\theta_{ij}^* - \tan\theta_{ij}\sin\theta_{ij}^*)}{d_{ij}};$$

wherein, $m_i$ represents a mass of the vehicle i; $v_i$ represents a speed of the vehicle i; $v_{ij}$ represents a relative speed between the vehicle i and the object j; $d_{ij}$ represents a relative distance between the vehicle i and the object j; $v_i$, $v_{ij}$, $d_{ij}$ each is a vector, $\theta_{ij}$ is an angle from $d_{ij}$ to $v_{ij}$, $\theta_{ij}^*$ is an angle from $d_{ij}$ to $v_i$, a counterclockwise direction is defined as positive; $w_{ki}$ is a probability weight of the vehicle i to maintain a current wheel angle and to change the current wheel angle; $w_{ij}$ is a probability weight of the object j to maintain an angle of a current state and to change the angle of the current state.

8. The real-time assessment device according to claim 7, wherein $$w_{ki} = \frac{p_{ki}(\delta_{ki})}{p_0(\delta_0)};$$

$$w_{kj} = \frac{p_{kj}(\delta_{kj})}{p_0(\delta_0)};$$

the object j is defined as a vehicle, $w_{kj}$ represents a probability weight of a vehicle j to maintain the current wheel angle and to change the current wheel angle; $p_{ki}(\delta_{ki})$ represents a steering probability of the vehicle i at a next moment steering angle along a steering angle $\delta_{ki}$; $p_{kj}(\delta_{kj})$ represents a steering probability of the vehicle j at the next moment steering angle along a steering angle $\delta_{kj}$; $\delta_0=0$ indicates straight-line driving, $p_0(\delta_0)$ indicates a probability that the vehicle i and the vehicle j go straight;

$p_{ki}(\delta_{ki})$, $p_{kj}(\delta_{kj})$, $p_0(\delta_0)$ are obtained by the following calculation expression:

$$p_k(\delta_k) = \frac{1}{3.7704 * \sqrt{2\pi}} e^{-\frac{\delta_k^2}{28.4318}},$$

$$\delta_k = k * \Delta\delta, k \in [-n, n],$$

wherein k, n∈Z; $\Delta\delta$ represents an increment of a steering angle; when k is a positive integer, $\delta_k$ means turning to left; when k is a negative integer, $\delta_k$ means turning to right.

* * * * *